Mar. 13, 1923.

S. L. THETFORD

HARVESTER

Filed June 6, 1919

Inventor,
Samuel L. Thetford
By
C. L. Parker
Atty.

Patented Mar. 13, 1923.

1,448,319

UNITED STATES PATENT OFFICE.

SAMUEL LEWIS THETFORD, OF BOLIGEE, ALABAMA.

HARVESTER.

Application filed June 6, 1919. Serial No. 302,294.

*To all whom it may concern:*

Be it known that I, SAMUEL L. THETFORD, a citizen of the United States, residing at Boligee, in the county of Greene and State of Alabama, have invented certain new and useful Improvements in Harvesters, of which the following is a specification.

This invention relates to agricultural implements, and more particularly to supporting devices for agricultural tools.

An object of the invention is the provision of an agricultural implement comprising a wheeled frame and an auxiliary frame pivotally connected to the wheeled frame to permit adjustment thereof.

A further object is the provision of an adjustable auxiliary frame having a transverse member adapted to form a guide or support for the agricultural tools.

Other objects and advantages of the invention will be apparent during the course of the following description.

In the accompanying drawings forming a part of this specification, and in which like numerals are employed to designate like parts throughout the same:

Figure 1:
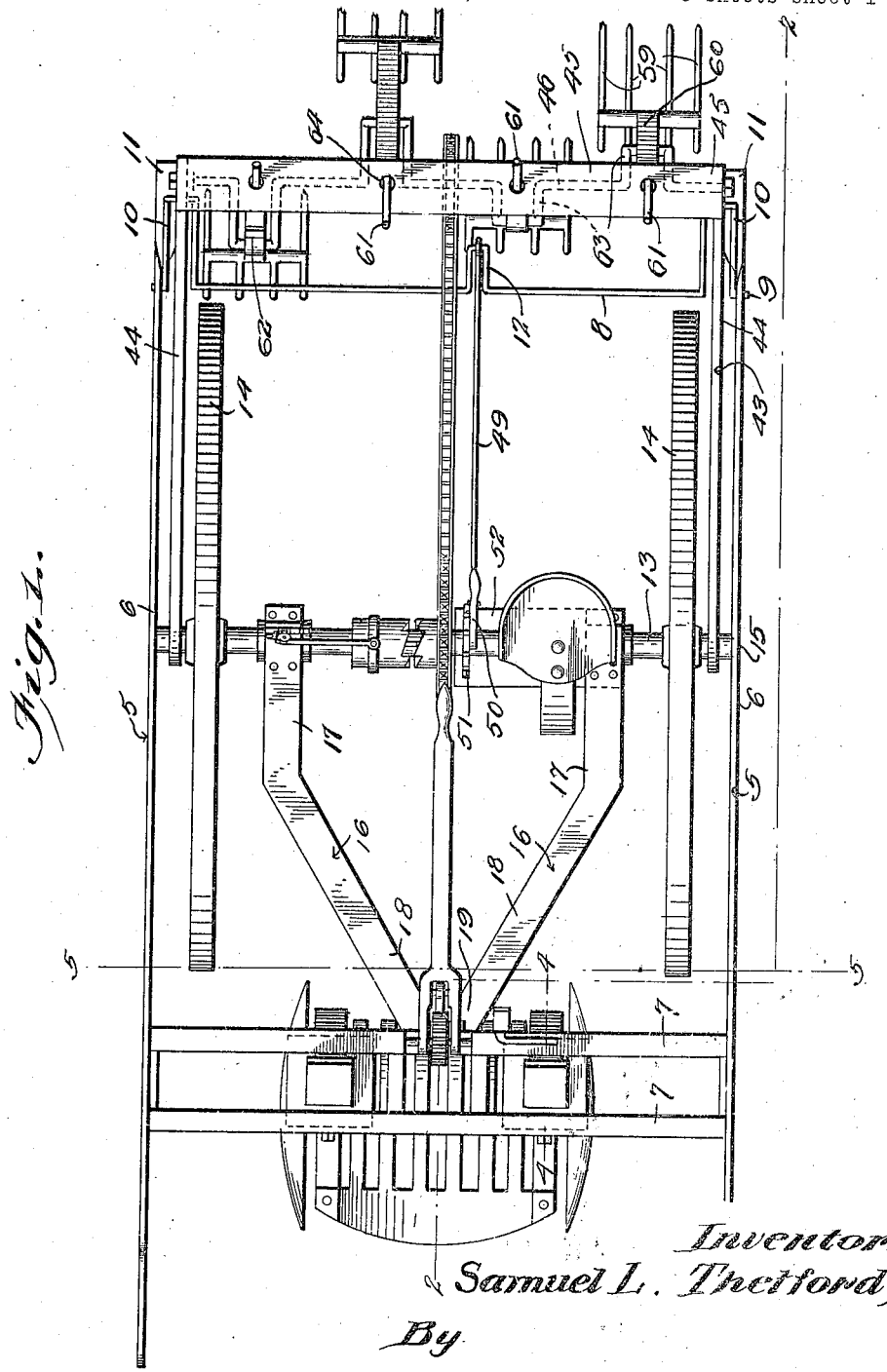
Figure 1 is a plan view of a machine embodying my invention.
Figure 2:
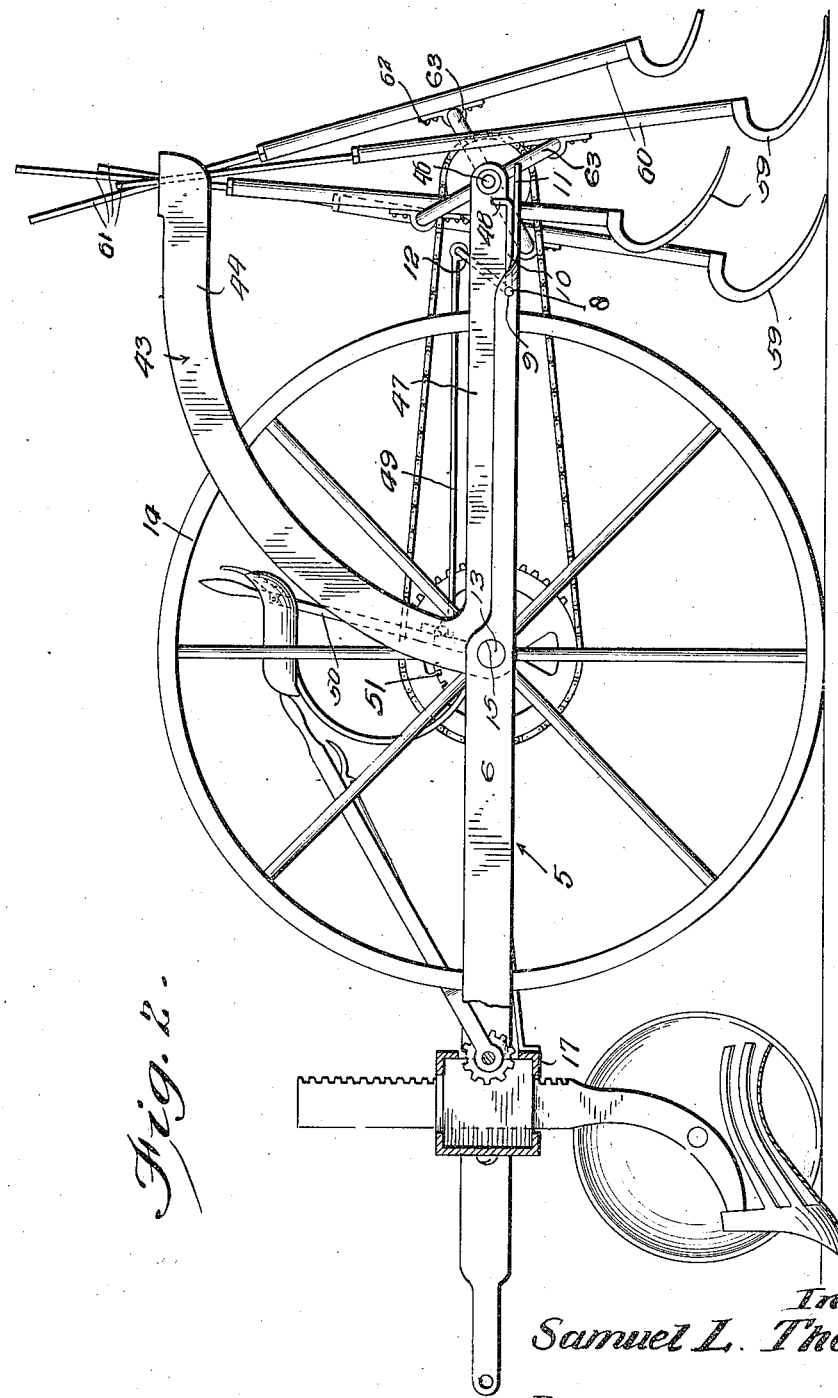
Figure 2 is a side elevation of the same, parts being shown in section.
Figure 3:
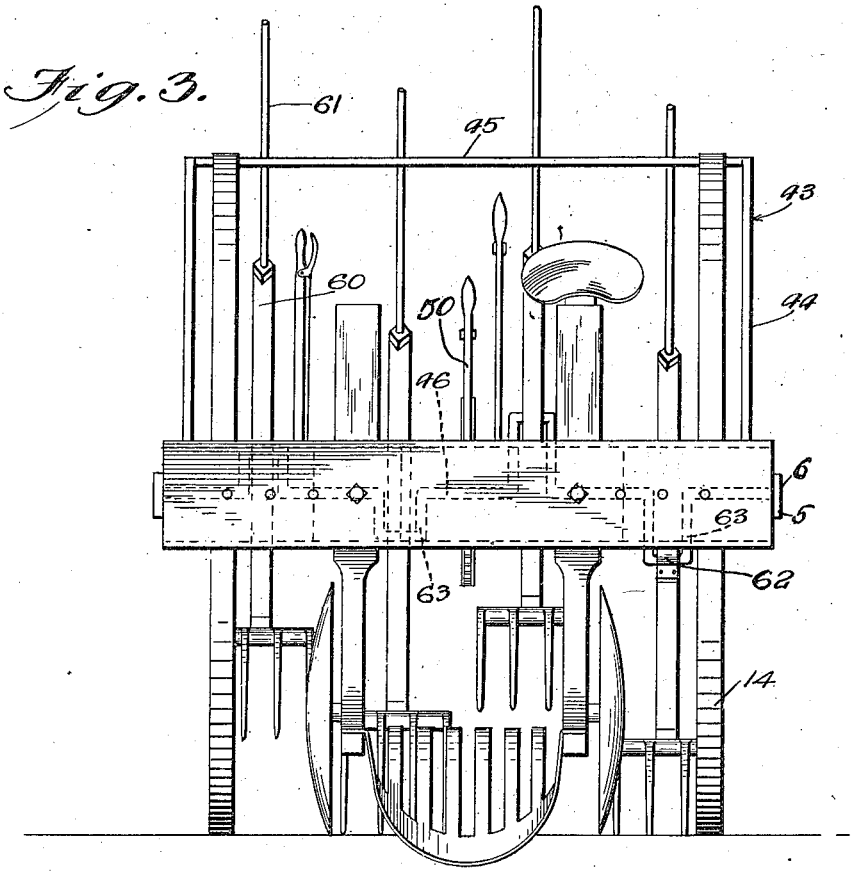
Figure 3 is a front end elevation of the machine.

The machine comprises a rectangular frame 5, including longitudinal beams 6, connected near their forward ends by transverse beams 7. The rear ends of the beams 6 are connected by a rock shaft 8, pivoted thereto, as shown at 9. This rock shaft has end elevating cranks 10, arranged upon and adapted to engage supports 11 secured to the rear ends of the beams 6, and preferably formed by twisting the ends. The rock shaft 8 is provided centrally thereof with a crank 12, to be operated by means to be described.

The numeral 13 designates a transverse shaft or axle, having traction wheels 14 rigidly secured thereto. The shaft 13 is pivotally connected with the longitudinal beams 6, as shown at 15. The numeral 16 designates an inner frame, embodying longitudinal beams 17, having their rear ends pivotally receiving the shaft 13, any suitable means being employed to prevent these beams moving longitudinally of the shaft. At their forward ends, the beams 17 converge, as shown at 18, and extend into a single member 19, which is bolted or otherwise rigidly secured to the inner beam 7, as shown.

The numeral 43 designates a vertically adjustable supplemental frame, comprising approximately V-shaped members 44, the forward ends of which are pivoted upon the axle 13. These V-shaped members are connected at their tops by a transverse strip 45, while their lower ends are connected by a crank shaft 46. The horizontal or lower arms 47 of the supplemental frame engage and are supported by elevating cranks 10, having extensions 48, which prevent lateral displacement thereof. The rock shaft 8 is turned by means of the link 49 pivoted to the crank 12, and this link is pivotally connected with a lever 50, which is pivoted to a quadrant 51, carried by a stationary plate 52, in turn secured to the longitudinal beam 17. The lever may be equipped with the usual latch mechanism to lock it against improper movement. It is thus seen that by moving the lever forwardly the cranks 10 will elevate the supplemental frame whereby it may be vertically adjusted to the desired position.

The means to agitate the dug plants or vines to free the fruit from the earth embody a plurality of forks 59, which are preferably longitudinally curved and faced rearwardly. These forks are carried by upstanding handles 60, to the upper end of which are rigidly secured rods 61. Secured to the handles 60 are bearings 62, pivotally receiving the cranks 63 of the crank shaft. The rods 61 are freely mounted within openings 64, formed in the transverse strip 45. It is thus seen that the rotation of the crank shaft 46 will impart a walking up and down movement to the forks 59, the same skimming the top of the soil and picking up the vines, agitating the same and freeing the fruit from the dirt.

The operation of the machine is as follows:

The machine is drawn or propelled forwardly by any suitable means. The auxiliary frame may be supported on the main frame at any desired adjustment and the tools 59 are rotated about a vertical axis, by the crank shaft 46. In the present illustration, I have shown rakes adapted to lift dug plants and fruit to completely free the plants and fruit from the soil. It will be apparent that any other type of tool may be employed in place of the rakes.

It is to be understood that the form of my invention herewith shown and described is to be taken as the preferred example of the same, and that various changes in the shape, size and arrangement of parts may be resorted to without departing from the spirit of the invention or the scope of the subjoined claim.

Having thus described my invention, I claim—

An agricultural implement comprising a wheel frame, an auxiliary frame pivotally connected with the wheel frame to be swung in a vertical plane, said auxiliary frame comprising a pair of substantialy V-shaped side bars, said side bars being connected to the wheel frame at the point of intersection of the two arms, cranks connecting the free ends of one of the arms of each of said side bars to the wheel frame, a crank shaft on which said cranks are arranged, an operating lever mounted on the wheel frame, connections between said lever and said crank shaft, a transverse member connecting the free ends of the other arms of the V-shaped side bars, and agricultural tools passing through said transverse member.

In testimony whereof I affix my signature in presence of two witnesses.

SAMUEL LEWIS THETFORD.

Witnesses:
HENRY N. MCALPINE,
J. W. MCALPINE.